(12) United States Patent
Sealine et al.

(10) Patent No.: US 6,250,433 B1
(45) Date of Patent: Jun. 26, 2001

(54) POSITIVE-LOCKING VEHICULAR PARKING BRAKE

(75) Inventors: Ronald L. Sealine; Ronald H. Werner; Sastry P. Chimalakonda, all of Burlington, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/317,511

(22) Filed: May 24, 1999

(51) Int. Cl.⁷ ...................................................... B62C 7/02

(52) U.S. Cl. ................................. 188/69; 188/31; 180/273

(58) Field of Search ................................. 188/31, 60, 69, 188/171, 173, 74, 265; 180/272, 273

(56) References Cited

U.S. PATENT DOCUMENTS

| | | | |
|---|---|---|---|
| 3,601,231 | * 8/1971 | Kolacz et al. | 188/69 |
| 4,467,896 | * 8/1984 | Sauerwein et al. | 188/69 |
| 4,955,452 | * 9/1990 | Simonz | 180/271 |
| 5,425,431 | * 6/1995 | Brandt et al. | 180/273 |
| 5,551,523 | * 9/1996 | Berg et al. | 180/273 |
| 5,992,576 | * 11/1999 | Berg et al. | 188/69 |

* cited by examiner

Primary Examiner—Robert J. Oberleitner
Assistant Examiner—Pamela J. Rodriguez
(74) Attorney, Agent, or Firm—Foley & Lardner (57) ABSTRACT

A work vehicle having a vehicle parking brake and a method are disclosed involving prevention of brake engagement at speeds beyond a predetermined threshold. The parking brake includes a rotatable plate having one or more pin-receiving openings therethrough radially spaced from the plate axis on an axially concentric circle, and a pin transverse to the plate at the circle, the pin being movable between a retracted position spaced from the plate and an extended position within the opening, such that the plate can rotate or is prevented from rotating depending on pin position. Each pin-receiving opening is bounded by leading and trailing edges, and the pin has a distal end portion, with one of the edge and distal end portion having a deflecting surface angled with respect to the pin axis, preferably a chamfer, such that, when the plate is rotating above a predetermined rate, contact of the trailing edge of the plate opening with the deflecting surface will cam the pin away from the rotating plate toward the retracted position and prevent brake engagement. The pin is preferably spring biased toward its extended position.

31 Claims, 5 Drawing Sheets

POSITIVE-LOCKING VEHICULAR PARKING BRAKE

FIELD OF THE INVENTION

The present invention relates generally to parking brakes for mobile vehicles and, more particularly, to parking brake systems designed to prevent parking brake engagement at speeds higher than a selected engagement-speed range.

BACKGROUND OF THE INVENTION

Parking brakes of many different kinds have long been used on a wide variety of vehicles, including on, among others, a wide variety of work vehicles. One example of prior devices is disclosed in U.S. Pat. No. 5,551,523 and is usable in a skid-steer loader. In some cases it is desirable that parking brakes not be engageable at vehicle speeds above some predetermined level—that is, that the braking effect they provide only be available in a predetermined speed range of zero up to the predetermined level. This range is referred to herein as the "engagement-speed range." If a parking brake system, like some, is unable to prevent parking brake engagement when the vehicle is moving at high speeds, brake engagement at such high speeds can cause major component failures because components of the parking brake are unable to absorb the high levels of kinetic energy that high speeds involve. The result can be breakage of brake parts and the consequent need for repairs.

There is a clear need for improvement in parking brake devices which cannot be engaged at speeds above a predetermined level—i.e., which can only be engaged at or below a given speed. There is a need for improved vehicle parking brake systems which are rendered unable to engage at high speeds—i.e., beyond those for which parking brake engagement is desirable. Parking brake systems, particularly systems with advanced capabilities, can tend to be complicated and, therefore, expensive. There is a need for an improved parking brake which is simple and economical in construction but still has the capability of being unable to fully engage at high speeds.

SUMMARY OF THE INVENTION

The present invention is an improved parking brake for vehicles of various kinds. Generally speaking, the parking brake of this invention operates by the interaction of a rotatable plate and a longitudinally movable pin which is movable into and out of engagement with openings in the plate. The nature of the structure as set forth below, and the method involved, form the present invention and result in a parking brake system overcoming problems and shortcomings of the prior art.

There is provided a work vehicle comprising a vehicle support structure with a plurality of wheels. A hydraulic lift assembly is mounted on the vehicle support structure with an attachment coupled to the hydraulic lift. The attachment can be a variety of tools such as a bucket, a backhoe arm, a cold scrapper, a jack hammer or any other type of attachment conventionally and typically coupled to a work vehicle. The work vehicle is also provided with a plate rotatable about an axis and coupled to at least one of the vehicle wheels, with the plate including a portion defining at least one opening radially spaced from the axis. The plate may also have a plurality of openings evenly spaced in the plate. A pin including an end movably supported and mounted on the vehicle support structure relative to the plate to engage the opening to restrict the plate and the wheel coupled to the plate from rotating, wherein one of the portion and the pin end include an angled surface with respect to the pin which prevents the pin from engaging the plate when the velocity of the opening relative to the pin exceeds a predetermined limit. The pin is biased to an extended position and a pin-retraction mechanism is mounted on the vehicle support structure and operatively connected to the pin for moving the pin from the extended position to a retracted position. The predetermined limit corresponds to a vehicle speed of no more than two (2) miles per hour with the preferred range between 1 and 1.5 miles per hour.

More specifically, the rotatable plate, which defines a plate axis and is operatively connected to a turning member of the vehicle such that plate rotation is related to vehicle speed —i.e., faster vehicle speed means faster plate rotation, has at least one pin-receiving opening therethrough, and preferably a plurality of such openings. The pin-receiving opening or openings are radially spaced from the plate axis along an axially concentric circle, i.e., such that each opening is radially equidistant from a plate axis. The openings are evenly spaced along such circle.

The aforementioned pin has a longitudinal pin axis and is deployed such that the pin axis is transverse to the plate at the opening circle. The pin is axially movable between a retracted position spaced from the plate and an extended position through one of the plate openings. When the pin is in the retracted position, the plate is free to rotate, and when the pin is in the extended position, the engagement with a plate opening prevents plate rotation—i.e., the parking brake is engaged to prevent movement.

Each pin-receiving opening in the rotatable plate is bounded by an edge, the edge including a leading edge and a trailing edge, sometimes referred to as leading edge and trailing edge portions. The pin, which is preferably deployed so that its axis is perpendicular to the plate, has a distal end at least a portion of which is a deflecting surface angled with respect to the pin axis. More specifically, the deflecting surface is angled such that contact thereon by the trailing edges (of the plate openings) during plate rotation will cam the pin back toward the retracted position. When such contact and resulting cam action occur, brake engagement is avoided because the pin cannot be fully inserted into a plate opening.

The pin and its deflecting surface, and the plate and its openings, are positioned and arranged such that, when the rotatable plate has rotational velocity above a predetermined threshold, the pin is prevented from moving fully into one of the openings by virtue of the aforementioned interaction of the leading edges with the deflecting surface. When the rotational velocity of the rotatable plate falls below a predetermined threshold, then movement of the pin toward its extended position allows the pin to enter one of the openings before the trailing edge of the opening can contact the deflecting surface on the distal end of the pin.

In highly preferred embodiments, the deflecting surface is a chamfer on the distal end of the pin. The chamfer is preferably at an angle to the pin axis of from 15 to 85 degrees, and most preferably at an angle of from 30 to 60 degrees. The chamfer has a first dimension parallel to the pin axis. Such chamfer dimension sets the axial length of pin movement which must occur before contact of a trailing edge with the pin. If trailing edge contact is with the chamfer, rotation of the plate will serve to cam the pin toward its retracted position and prevent full pin insertion into an opening. Another embodiment of the present invention has the angled deflecting surface on the open edge, with the pin having a constant diameter at the distal end. It is also possible to have both the edge of the opening and the distal end of the pin having an angled deflecting surface to cause the camming action.

The apparatus of this invention includes a biasing structure for biasing the pin to its extended position and a pin-retraction mechanism for moving the pin from its extended position to its retracted position. The biasing structure determines the speed of the axial movement of the pin toward its extended position. Not only are the pin and its deflecting surface, and the plate and its openings positioned and arranged to provide the critical aforementioned camming action above certain speeds, but the biasing structure is selected for that purpose as well. That is, it is selected such that when vehicle speed is above a predetermined velocity, rotation of the plate will be at a rotational velocity such that pin speed will move the pin a distance less than the first dimension (i.e., the axially parallel dimension of the preferred chamfer) while the pin and any one of the openings are in alignment.

In certain preferred embodiments, the biasing structure is a compression spring. The pin retraction mechanism may be a manual, hydraulic, pneumatic or electrical type.

In highly preferred embodiments, the pin and plate axes are preferably parallel. The rotatable plate is most preferably an annular disc with the plurality of openings being along the periphery of the disc such that the openings are radially open along the periphery of the disk. However, the invention also contemplates openings that are spaced inwardly form the periphery.

This invention also involves a method, involving the aforementioned structure, for preventing engagement of a vehicle parking brake at vehicle speeds above a predetermined speed. The method includes the steps of moving the pin toward insertion in one of the openings at a particular pin speed, and rotating the rotatable plate at an rotational velocity above a threshold level which corresponds to the predetermined vehicle speed, the rotational velocity and pin speed being such that before the pin is fully inserted in one of the openings the deflecting surface of the pin is contacted by one of the leading edges and cammed by it toward the retracted position, thus preventing pin movement into the opening.

When the deflecting surface on the pin is a chamfer, as preferred, the rotating is at a rotational velocity such that the pin speed will move the pin a distance less than the axially parallel dimension of the chamfer while the pin and one of the openings are in alignment. More specifically, the rotating of the plate in the time during which the pin moves a distance equal to the first dimension is through an angle about the plate axis which is greater than that defined between the leading and trailing edges.

The parking brake system, in addition to the pin and rotating plate described above, also includes a vehicle drive apparatus. The vehicle drive apparatus may include a central drive motor which may be coupled to two (or more) sprockets. The sprockets are chain-connected to driven wheels of the vehicle. One of the driven wheels may be a front vehicle wheel and another a rear wheel. The rotatable plate may be rotatably mounted to be coaxial with the driving sprockets. The pin may be mounted so that its axis is parallel to the driving sprockets axis.

The invention can be applied to any vehicle having a turning member, for which vehicle a parking brake function is desirable. The particular structure just described is an example of application of the parking brake system of this invention.

DETAILED DESCRIPTIONS OF PREFERRED EMBODIMENTS

Preferred embodiments of the inventive parking brake system and method will now be described in reference to the drawing figures. The parking brakes described and illustrated have the capability of preventing parking brake engagement at speeds above a predetermined speed threshold.

Figure 1:
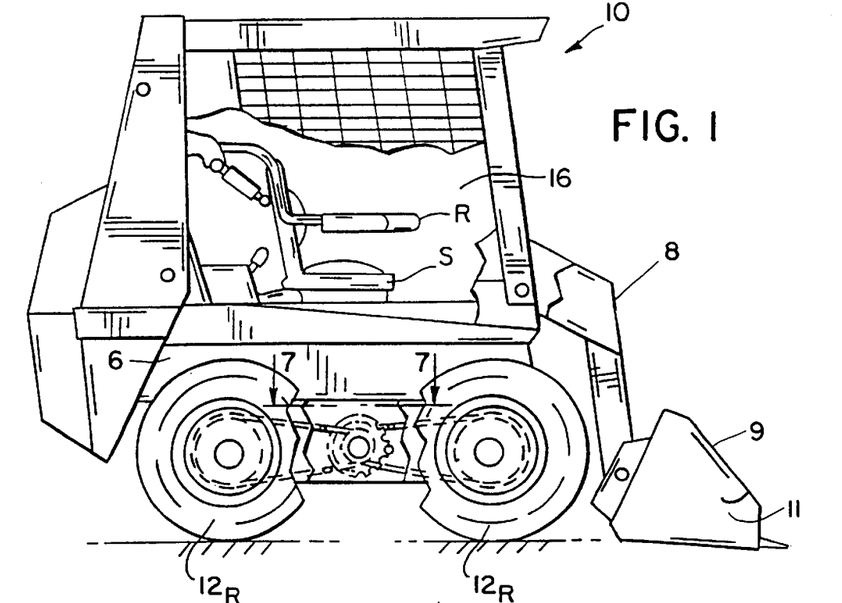
FIG. 1 is a side elevation of a skid-steer loader having the parking brake of the present invention.

Referring to FIG. 1, a work vehicle 10 of the skid-steer type loader having the parking brake of this invention mounted on a vehicle support structure 6 is shown. Loader 10 is but one example of a type of vehicle for which the new parking brake is suited. The work vehicle 10 is provided with a hydraulic lift assembly 8 which is controlled from the work vehicle cab 16. The hydraulic lift assembly 8 can support and have coupled thereto an attachment 9 such as a bucket 11 or backhoe arm or cold scrapper, or jack hammer or any other type of attachment 9 conventionally and typically mounted on a work vehicle 10.

In a skid-steer loader 10, none of the wheels 12 are steerable in the sense of the front wheels of an automobile being steerable. Rather, the left-side wheels $12_L$, $12_L$ (not shown) of the skid-steer loader 10 are drivingly coupled together and driven by a hydraulic motor 14. Similarly, the right-side wheels $12_R$, $12_R$ of skid-steer loader 10 are drivingly coupled together and driven by another hydraulic motor 14. Motor speeds are controlled by separate hydraulic valve levers (not shown) in the operator's cab 16.

Skid-steer loader 10 follows a straight-line path when both motors 14, 14 (and, therefore, both left and right sets of wheels $12_L$, $12_R$) turn at the same rate, but skid-steer loader 10 can be steered by driving motors 14, 14 at differing speeds. Since none of wheels 12 are on a steerable axle, wheels 12 necessarily skid somewhat when the motors 14, 14 run at different speeds.

Further, skid-steer loader 10 has the capability of turning on its own center. That is, if motors 14, 14 are driven in opposite directions, left wheels $12_L$ drive (for example) rearwardly and right wheels $12_R$ drive forwardly. For at least that reason, skid-steer loaders 10 are highly maneuverable in tight working quarters. A skid-steer loader may also be provided with endless tracks mounted on the wheels 12 to provide additional capabilities in certain terrain and conditions.

Figure 2A:
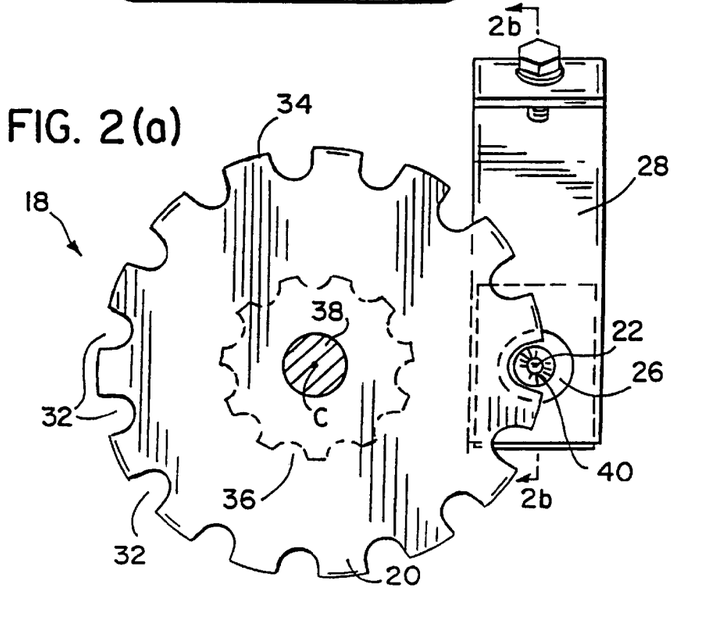
FIG. 2(a) is a front elevation of the parking brake of the present invention.
Figure 2B:
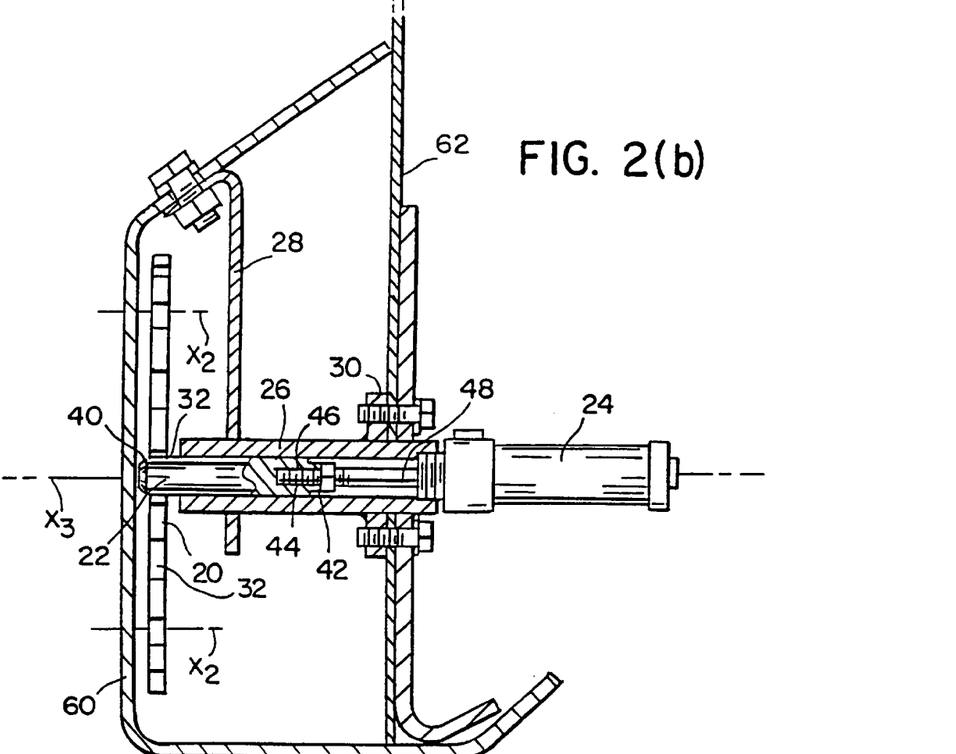
FIG. 2(b) is a cross-sectional view of the parking brake taken along line 2b—2b of FIG. 2(a).

Referring also to FIGS. 2(a) and 2(b), the parking brake 18 of the present invention is shown in greater detail. In the preferred arrangement, each motor 14, 14 is equipped with a separate parking brake 18 as will be described in more detail below.

Parking brake 18 includes a plate 20, a pin 22, a cylinder 24, a cylinder-pin interface 26, and support brackets 28, 30. Plate 20 of parking brake 18 may be of any size, shape and material capable of accomplishing the objectives of the present invention. However, in a highly preferred embodiment of the present invention as shown in FIGS. 2(a) and 2(b), plate 20 is in the form of an annular disc. Disc 20 is somewhat thin in its thickness dimension as compared with the dimension of its outer periphery or outer diameter. Disc 20 is preferably made of metal, although any sufficiently-strong material may be used.

Disc 20 is mounted for rotation about a longitudinal axis $X_1$ through the center C of disc 20. Disc 20 has numerous openings 32 through it so that the longitudinal axes $X_2$ of the openings 32 are parallel with longitudinal axis $X_1$ around which the disc rotates. In the highly preferred embodiment of the present invention, openings 32 are evenly circumferentially spaced along the outer periphery of disc 20 and radially equidistant from a center C of disc 20.

Openings 32 may be of any shape necessary in order to accomplish the objectives of the present invention. In the preferred embodiment, openings 32 in the outer periphery of disc 20 shown in FIG. 2(a) are radially inwardly semicircular and complementary to the shape of the outer diameter of pin 22.

Openings 32 are located along an opening-locus circle 34 so that as disc 20 rotates, a pin 22 having a longitudinal axis $X_3$ parallel with longitudinal axes $X_2$ of openings 32 can be extended into and through one of openings 32 to stop rotation of disc 20. When pin 22 extends into one of openings 32, neither disc 20 nor the left and right set of vehicle wheels $12_L$, $12_R$ can continue to rotate. Therefore, vehicle 10 is brought to a stop.

The inner periphery of disc 20 has protrusions 36 which extend radially inwardly therefrom. Protrusions 36 from the inner periphery of disc 20 shown in FIG. 2(a) are semicircular in shape, but protrusions 36 of any shape capable of mating with the complementary recesses or indentations of a gear, mounted on the end of an axle leading from a drive motor 14 and onto which disc 20 is to be mounted, could be used. That is, protrusions 36 form a type of "gear tooth" which affixes disc 20 to a shaft 38 and prevents rotation of disc 20 with respect to shaft 38.

Figures 3, 5A:
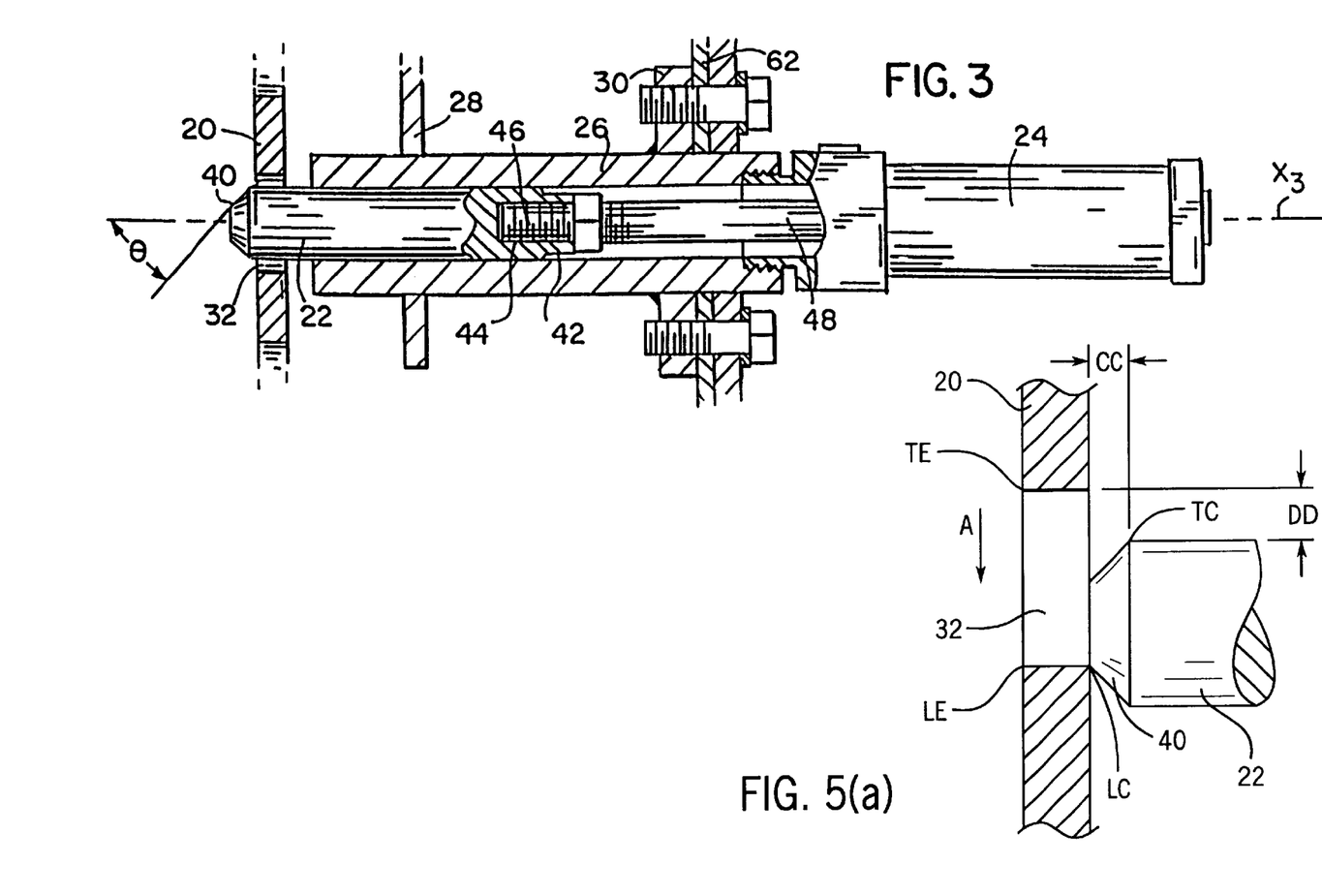
FIG. 3 is a representative cross-sectional view through the pin and cylinder-pin interface of the parking brake of FIG. 2(a) showing details thereof.
FIGS. 5(a)–(d) are representative cross-sectional plan views of the pin, having a deflecting surface, moving towards the openings of the rotating disc.

Openings 32 in the outer periphery of disc 20 are capable of being engaged by or accepting a pin 22 therethrough. As shown more clearly in FIG. 2(b), pin 22 has a main, non-chamfered length which has an outer diameter somewhat less than the outer diameter of openings 32 in disc 20 so that openings 32 in disc 20 are capable of accepting pin 22 therethrough to stop the rotation of disc 20. Pin 22 is preferably cylindrical and made of metal, although any suitable material can be used. Pin 22 has a main non-chamfered length with a front end and a rear end. The distal (i.e., front) end of pin 22 is chamfered to form a chamfered portion 40. FIG. 3 shows the chamfering at an angle θ with respect to pin axis $X_3$. θ is in a range of from 15 to 85 degrees, and most preferably within the range of from 30 to 60 degrees.

The rear end of pin 22 has a grooved or indented portion 42 as shown in FIG. 3. The outer diameter of indented portion 42 is slightly less than the outer diameter of the main longitudinal, non-chamfered length of pin 22. The rear end of pin 22 also includes a threaded tunnel 44 through the circular rear end thereof for the mating acceptance of a screw or bolt end 46 of a shaft or rod 48 of a cylinder 24, or any other means of attachment. In this way, pin 22 may be mounted directly to a pin support structure, without any additional hardware. In the alternative, pin 22 may be sub-assembled to cylinder 24 for ease of assembly. An O-ring may be included to provide a seal, if necessary.

Pin 22 is spring-biased into a normally extended position so that pin 22 extends outwardly from an end of a cylinder-pin interface or tubular housing 26. Cylinder-pin interface 26 is, in turn, connected to cylinder 24. Pin 22 is moved from its normally spring-biased (i.e., extended) position to a retracted position by a control mechanism 50. Control mechanism 50 supplies pressure P to a first chamber 52 of two chambers 52, 54 of cylinder 24. Cylinder 24 may be of the hydraulic or pneumatic type.

Upon activation of cylinder 24, pressure P is supplied to first chamber 52 within cylinder 24 so as to compress the normally extended spring 56 within second chamber 54 of cylinder 24. This allows the normally extended pin 22 to be retracted. To deactivate cylinder 24, pressure P in first chamber 52 is reduced to substantially zero psi or, at least, diminished to a value at which the spring force of compression spring 56 can overcome restraining force and move pin 22 back into its normally extended position. A locking device (not shown) may be provided to lock cylinder 24 in place, and also to keep cylinder ports 58 oriented properly for pressure delivery routing.

Cylinder-pin interface 26 is shown in cross-section in both FIGS. 2(b) and 3. Cylinder-pin interface 26 is a cylindrical, hollow tube which houses pin 22 at one end and shaft 48 of cylinder 24 at the other, opposite end.

There are two support brackets 28, 30 shown in FIGS. 2(b) and 3. First support bracket 28 has a straight plate portion with a bent end portion that is bent into an approximately V-shape. This first bracket 28 is mounted near the front end of cylinder-pin interface 26 for attachment of a casing 60 to cover parking brake 18 for enclosing rotating disc 20 therewithin. Second support bracket 30, shown as a rectangular plate, is mounted near the rear end of cylinder-pin interface 26 for attachment to chassis 62 of vehicle 10. The preceding description is only an example and is not limiting; any supporting structure would suffice.

Figures 4, 6:
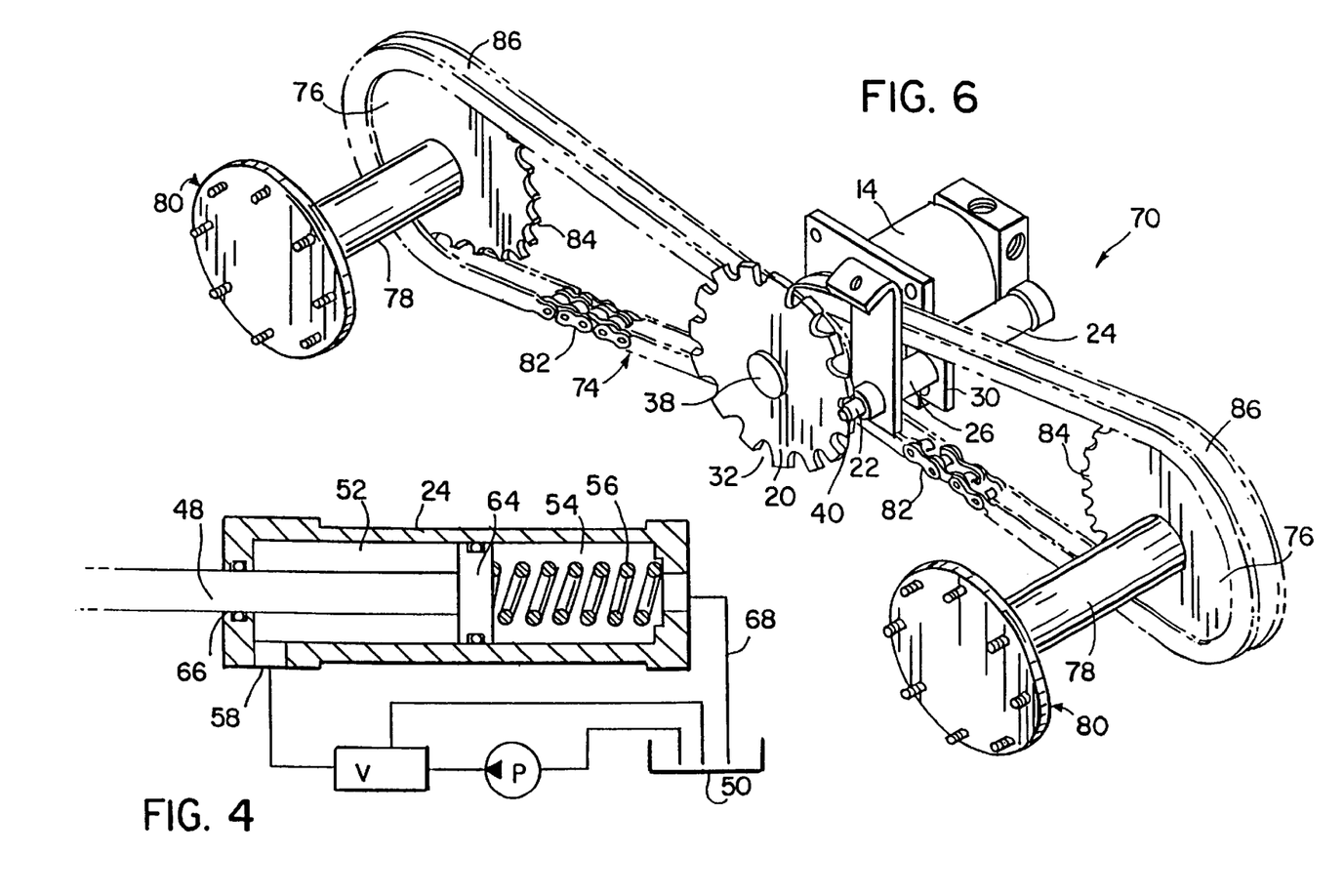
FIG. 4 is a representative cross-sectional view through the cylinder of the parking brake of FIG. 2(a) of the present invention.
FIG. 6 is a perspective view of the parking brake system of the present invention shown in conjunction with the drive apparatus for two of the vehicle wheels.

Referring to FIG. 4, a cross-sectional view of cylinder 24 of the present invention is shown. Cylinder 24 includes a translatable piston 64 therewithin which moves back and forth within first pressure-receiving chamber 52 inside of cylinder 24. Piston 64 has a central shaft or rod 48 which extends and retracts with respect to a front central opening 66 in the cylinder 24. Second spring chamber 54 of the cylinder 24 is connected to a drain line 68 to prevent moisture from entering system and to maintain the pressure P in second spring chamber 54 at substantially atmospheric pressure.

Spring 56, within second spring chamber 54 of cylinder 24, urges pin 22 to extend outwardly past the front of cylinder-pin interface 26 and through one of openings 32 of disc 20. When pressure P is supplied to first chamber 52, spring 56 is compressed and pin 22 is retracted from its normally spring-biased extended position.

The design feature of parking brake 18 of the present invention which prevents undesired engagement of brake 18 at higher speeds is the dimensional difference between the size of opening 32 in disc 20 and the diameter of the main longitudinal, non-chamfered length of pin 22 and chamfered portion 40 on the front end of pin 22.

Key in preventing undesirable engagement of brake 18 is the relationship between the angular velocity of disc 20 and the linear velocity of pin 22. Factors that affect this relationship include the size of opening 32 in disc 20, the dimensions of chamfered portion 40, the diameter of pin 22, and the magnitude of the spring force applied to pin 22. By controlling these variables, the engagement speed range is controlled. The engagement speed range is the range of rotational speeds of disc 20 below which pin 22 extends completely and engages an opening 32 of disc 20, thereby causing disc 20 to stop rotating and above which pin 22 does not extend completely so that disc 20 is free to rotate. In the preferred embodiment, the predetermined limit corresponds to a vehicle speed of no more than two (2) miles per hour with the highly preferred embodiment having the predetermined limit corresponding to a vehicle speed between 1 and 1.5 miles per hour. This is best illustrated by the following example.

Figure 5B:
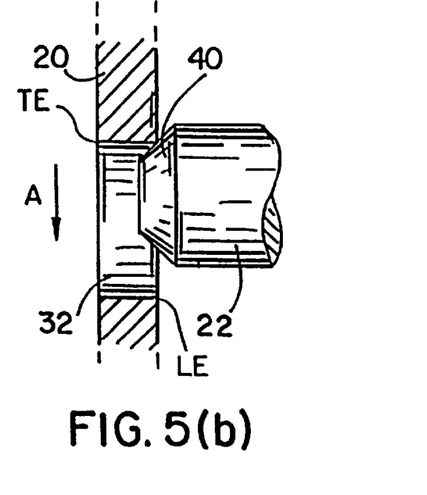
Figure 5C:
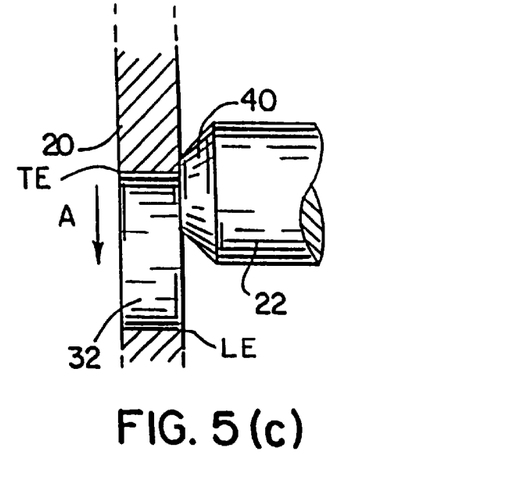
Figure 5D:
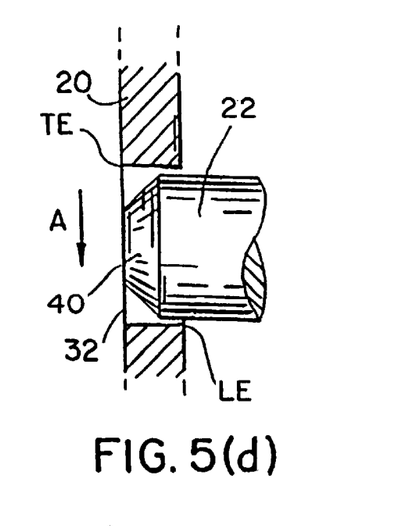
Figure 5E:
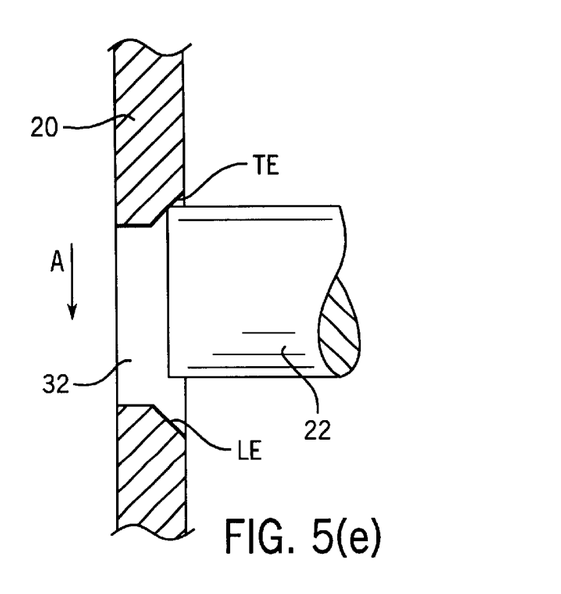
FIG. 5(e) is a representative cross-sectional plan view of one embodiment of the pin contacting the deflecting surface of the edge of one of the pin-receiving openings in the rotatable plate.

Referring to FIG. 5(a), it is assumed that disc 20 is rotating in the direction of arrow A. It is also assumed that pin 22 is released for travel toward disc 20 when the leading edge LE of an opening 32 is aligned with the leading edge LC of chamfered portion 40 of pin 22. If the rotational speed (angular velocity) of disc 20 is above some predetermined speed range, pin 22 is unable to travel the distance CC (i.e., the horizontal distance between leading edge LC and trailing edge TC of chamfered portion 40) to extend fully through opening 32 in the time it takes trailing edge TE of opening 32 to travel distance DD (i.e., the vertical distance between trailing edge TE of opening 32 and the outer diameter of pin 22 or the length of the arc that disc 20 has to travel). Therefore, trailing edge TE of opening 32 strikes chamfered portion 40 of pin 22 as shown in FIG. 5(b). As a result, pin 22 is "cammed" rearwardly (i.e., away from disc 20) and does not engage opening 32. As shown in FIG. 5(c), disc 20 continues rotating and the front surface of pin 22 contacts an outer surface of disc 20 until the adjacent opening 32 reaches it, where pin 22 may engage opening 32 to extend fully through opening 32 if the rotational speed is below a predetermined range. It should be understood that the opening 32 in the plate 20 can be provided with an angled deflecting surface on the leading edge and trailing edge as illustrated in FIG. 5(e), with the pin 22 having the distal end having a constant cylindrical diameter along the longitudinal axis, in other words, not chamfered.

It is next assumed that disc 20 is rotating in the direction of arrow A, but at a significantly lower speed. It is also assumed that pin 22 is released for travel toward disc 20 when leading edge LE of an opening 32 is aligned with leading edge LC of chamfered portion 40 of pin 22. If the rotational speed or angular velocity of disc 20 is below some predetermined range, pin 22 would extend fully through opening 32. To put it in other terms, pin 22 would travel through its full travel distance before trailing edge TE of opening 32 has traveled from the starting point of the full travel distance to the ending point of the full travel distance. Therefore, disc 20 will stop rotating when trailing edge TE of opening 32 strikes the cylindrical, non-chamfered length of pin 22 as shown in FIG. 5(d). As applied to a skid-steer, this causes the left and right pins to engage openings 32 in left and right discs 20 causing the left and right vehicle wheels $12_L$, $12_R$ to stop rotating.

Parking brake 18 of the present invention may also be used as a detent against movement of vehicle 10 when using optional attachments. Brake 18 may also have an interlock to prevent a mishap when, for example, the operator's seat S is not occupied, the restraining mechanism R (i.e., a raisable and lowerable bar that must be moved into its lowered, operational position when the operator is in operator's seat S for vehicle 10 to move) is not in its operational position, or there is a power failure. In any of those above-described events, parking brake 18 engages automatically.

The levers or control handles (not shown) may be provided with a manual override mechanism to engage brake 18. This feature allows the vehicle operator to use attachments without the problem of undesirable movement of vehicle 10, since in that case, the engine is running, but vehicle 10 needs to be stationary.

An override system may be provided to release brake 18 to move a disabled vehicle 10. This is a very useful feature should it become necessary to tow vehicle 10. Once the engine is started, the override mechanism automatically resets.

Figure 7:
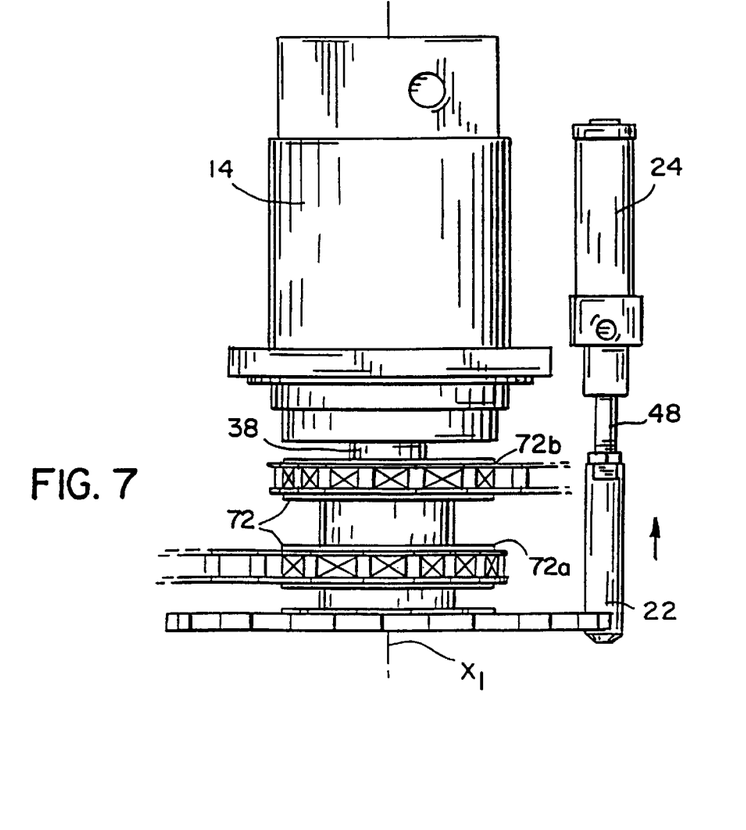
FIG. 7 is a top plan view of a portion of the vehicular drive apparatus and parking brake of the present invention showing with elements removed for clarity.

Referring now to FIG. 6, other aspects of the parking brake system will now be described. The parking brake system includes a vehicular drive apparatus 70 and parking brake 18 as has been described above with reference to FIGS. 2(a)–(b). Drive apparatus 70 includes a motor 14 which turns a pair of sprockets 72, identified as $72_a$, $72_b$, in FIG. 7. Although FIG. 6 shows a single motor 14 as being used to turn sprockets 72 and therefore drive either a left or right pair of wheels $12_L$, $12_R$ of vehicle 10, as many motors as are needed to drive wheels 12 could be used.

Cylinder 24 of parking brake 18 is mounted radially outwardly from the drive mechanism or motor 14. The longitudinal axes $X_3$ of cylinder 24 and of shaft 48 of cylinder 24 are parallel to longitudinal axis $X_1$ of shaft 38 connected to the drive mechanism or motor 14 on which sprockets 72 and rotating disc 20 are mounted.

Each sprocket $72_a$, $72_b$ has a set of radially outwardly extending teeth and each sprocket $72_a$, $72_b$ is operatively connected to a chain-and-gear drive arrangement 74. The chain-and-gear drive arrangement 74 includes a gear 76 mounted for rotation on axle 78 of each of the wheel mounts 80 on which the wheels of vehicle 10 are mounted.

Chain-and-gear drive arrangement 74 also includes a chain 82, similar to a bicycle chain, which is mounted in such a way so as to interconnect with the teeth of one sprocket $72_a$ and teeth 84 of gear 76 connected to axle 78 of wheel mounts 80. When motor 14 is activated, each sprocket $72_a$, $72_b$ mounted on shaft 38 extending from motor 14 is caused to rotate in the same direction and thus chains 82 mesh with the teeth of gears 76 mounted on the axles 78 of wheel mounts 80 and with the teeth of each of sprockets $72_a$, $72_b$ so as to make the left and right sets of wheels $12_L$, $12_R$ rotate. Chain 82 may be partially covered by a guard 86 as shown in FIG. 6 to prevent materials from getting between chain 82 and teeth of gears 76 which could cause misalignment.

In operation, the functioning of parking brake 18 and parking brake system of the present invention as applied to a skid-steer will now be described. The skid-steer is shown by way of example only and does not limit the application of the parking brake system of this invention; the invention is applicable to a wide variety of vehicles.

When the operator readies vehicle 10 for travel, pressure P is supplied to first chamber 52 of cylinder 24 and piston 64 is moved toward spring 56 in second chamber 54 of cylinder 24 to compress spring 56. Then, the normally spring-biased pin 22 is retracted from its extended position away from the disc 20 and vehicle drive motors 14 (and the left and right sets of wheels $12_L$, $12_R$ chain-driven thereby) may rotate.

When it is desired to bring vehicle 10 to a stop, pressure P in first chamber 52 of cylinder 24 is relieved. Spring 56 thereupon urges piston 64 in a direction to extend pin 22 toward disc 20. However, if the rotational speed or angular velocity of disc 20 is sufficiently high, trailing edge TE of an opening 32 contacts the angled deflecting surface, i.e., chamfered portion 40 of pin 22 and prevents pin 22 from extending completely through opening 32, thereby preventing engagement of the brakes. But if rotational speed or angular velocity of disc 20 is sufficiently low, in other words the vehicle speed is no more than two (2) miles per hour so that the corresponding disc 20 speed is at below the predetermined limit (optimally between 1 to 1.5 miles per hour), then pin 22 extends far enough into an opening 32 so that trailing edge TE of opening 32 hits the main longitudinal, non-chamfered length of pin 22, thereby resulting in parking brake engagement. The rotation of disc 20 and the motion of vehicle 10 are stopped.

Although the invention has been described in conjunction with specific embodiments thereof, it is evident that many alternatives, modifications and variations will be apparent to those ordinarily skilled in the art. Accordingly, it is intended to embrace all such alternatives, modifications and variations that fall within the spirit and scope of the appended claims.

What is claimed is:

1. A positive parking brake assembly for a motorized vehicle having a plurality of wheels, the assembly comprising:
    a plate rotatable about an axis and coupled to at least one of the vehicle wheels, the plate including a portion defining at least one opening radially spaced from the axis; and,
    a pin having a longitudinal axis including an end movably supported relative to the plate to engage the opening to restrict the plate and the wheel coupled to the plate from rotating, wherein the pin and plate axes are parallel and wherein one of the portion and the pin end include an angled surface with respect to the pin which, when the plate is rotating, prevents the pin from engaging the plate when the velocity of the opening relative to the pin exceeds a predetermined limit.

2. The assembly of claim 1, having a plurality of openings evenly spaced in the plate.

3. The assembly of claim 2, wherein each opening is bounded by an edge, which includes a leading edge portion and a trailing edge portion.

4. The assembly of claim 3, wherein each opening and the pin have an angled deflecting surface arranged such that, when the plate has rotational velocity above a predetermined threshold, the pin is prevented from moving fully into one of the openings by virtue of the interaction of at least one of the trailing edges with the pin.

5. The assembly of claim 2, wherein the plate is an annular disc and the plurality of openings are along the periphery of the disc such that the openings are open along the disc periphery.

6. The assembly of claim 1, wherein the angled surface is a chamfer.

7. The assembly of claim 6, wherein the chamfer is at an angle to the pin longitudinal axis of from 15 to 85 degrees.

8. The assembly of claim 7, wherein the angle is from 30 to 60 degrees.

9. The assembly of claim 1, including a biasing structure for biasing the pin to an extended position and a pin-retraction mechanism for moving the pin from the extended position to a retracted position.

10. A positive parking brake to prevent engagement of the brake when a vehicle is moving faster than a predetermined speed, with the vehicle having at least one turning member the rotation of which is related to vehicle speed, the parking brake comprising:
    a rotatable plate defining a plate axis and operatively connected to the turning member, and having at least one pin-receiving opening therethrough radially spaced from the plate axis, the pin-receiving opening bound by an edge, the edge including a leading edge portion and a trailing edge portion; and
    a pin having a longitudinal pin axis transverse to the plate wherein the pin and plate axes are parallel and the pin having a distal end portion at least a portion of which is a deflecting surface angled with respect to the pin axis such that contact of the trailing edge with the deflecting surface when the plate is rotating will cam the pin toward a retracted position, thereby preventing brake engagement by preventing pin movement into the opening, the pin being movable between the retracted position and an extended position within the opening, whereby the plate can rotate or is prevented from rotating depending on pin position.

11. The parking brake of claim 10 having a plurality of the openings evenly spaced in the rotatable plate.

12. The parking brake of claim 11, wherein the pin and its deflecting surface and the plate and its openings are positioned and arranged such that, when the rotatable plate has rotational velocity above a predetermined threshold, the pin is prevented from moving fully into one of the openings by virtue of the interaction of at least one of the trailing edges with the deflecting surface.

13. The parking brake of claim 11, wherein the plate is an annular disc and the plurality of openings are along the periphery of the disc such that the openings are open along the disc periphery.

14. The parking brake of claim 11, wherein the deflecting surface is a chamfer.

15. The parking brake of claim 14, wherein the chamfer is at an angle to the pin axis of from 15 to 85 degrees.

16. The parking brake of claim 15, wherein the angle is from 30 to 60 degrees.

17. The parking brake of claim 11, including a biasing structure for biasing the pin to the extended position and a pin-retraction mechanism for moving the pin from the extended position to the retracted position.

18. A method of preventing engagement of a vehicle parking brake at vehicle speeds above a predetermined speed on a vehicle having at least one turning member, where the vehicle parking brake includes a rotatable plate which defines a plate axis, is operatively connected to the turning member, and has a plurality of pin-receiving openings evenly spaced along an axially concentric circle, each opening being bounded by an edge including leading edge and trailing edge portions, and a pin having a longitudinal pin axis transverse to the plate at the circle, the pin being movable between a retracted position spaced from the plate and an extended position within the opening and having a distal end at least a portion of which is a deflecting surface angled with respect to the pin axis, comprising the steps of:

moving the pin toward insertion in one of the openings at a pin speed; and rotating the rotatable plate at a rotational velocity above a threshold level which corresponds to the predetermined vehicle speed, wherein the deflecting surface is a chamfer on the distal end of the pin, the chamfer having a first dimension parallel to the pin axis, and wherein the rotating is at a rotational velocity such that the pin speed will move the pin a distance less than the first dimension while the pin and one of the openings are in alignment, the rotational velocity and pin speed being such that before the pin is fully inserted in one of the openings the deflecting surface of the pin is contacted by one of the trailing edges and cammed thereby toward the retracted position, thereby to prevent pin movement into the opening.

19. A method of preventing engagement of a vehicle parking brake at vehicle speeds above a predetermined speed on a vehicle having at least one turning member, where the vehicle parking brake includes a rotatable plate which defines a plate axis, is operatively connected to the turning member, and has a plurality of pin-receiving openings evenly spaced along an axially concentric circle, each opening being bounded by an edge including leading edge and trailing edge portions, and a pin having a longitudinal pin axis transverse to the plate at the circle, the pin being movable between a retracted position spaced from the plate and an extended position within the opening and having a distal end at least a portion of which is a deflecting surface angled with respect to the pin axis, comprising the steps of:

moving the pin toward insertion in one of the openings at a pin speed; and rotating the rotatable plate at a rotational velocity above a threshold level which corresponds to the predetermined vehicle speed, wherein the deflecting surface is a chamfer on the distal end of the pin, the chamfer having a first dimension parallel to the pin axis, and comprising rotating the plate through an angle about the plate axis greater than that defined between the leading and trailing edges in the time during which the pin moves a distance equal to the first dimension, the rotational velocity and pin speed being such that before the pin is fully inserted in one of the openings the deflecting surface of the pin is contacted by one of the trailing edges and cammed thereby toward the retracted position, thereby to prevent pin movement into the opening.

20. A work vehicle comprising:

a vehicle support structure;

a plurality of wheels rotatably supported by the vehicle support structure;

a hydraulic lift assembly supported by the vehicle support structure;

an attachment coupled to the hydraulic lift assembly;

a plate rotatable about an axis and coupled to at least one of the vehicle wheels, the plate including a portion defining at least one opening radially spaced from the axis; and, a pin having a longitudinal axis including an end movably supported and mounted on the vehicle support structure relative to the plate to engage the opening to restrict the plate and the wheel coupled to the plate from rotating, wherein the pin and plate axes are parallel, and, wherein one of the portion and the pin end include an angled surface with respect to the pin which, when the plate is rotating, prevents the pin from engaging the plate when the velocity of the opening relative to the pin exceeds a predetermined limit.

21. The work vehicle of claim 20, wherein the attachment is a bucket.

22. The work vehicle of claim 20, wherein the attachment is a backhoe arm.

23. The work vehicle of claim 20, including a biasing structure for biasing the pin to an extended position and a pin-retraction mechanism mounted on the vehicle support structure and operatively connected to the pin for moving the pin from the extended position to a retracted position.

24. The assembly of claim 20, having a plurality of openings evenly spaced in the plate.

25. The assembly of claim 24, wherein each opening is bounded by an edge, which includes a leading edge portion and a trailing edge portion.

26. The assembly of claim 25, wherein each opening and the pin have an angled deflecting surface arranged such that, when the plate has rotational velocity above a predetermined threshold, the pin is prevented from moving fully into one of the openings by virtue of the interaction of at least one of the trailing edges with the pin.

27. The assembly of claim 24, wherein the plate is an annular disc and the plurality of openings are along the periphery of the disc such that the openings are open along the disc periphery.

28. The assembly of claim 20, wherein the angled surface is a chamfer.

29. The assembly of claim 28, wherein the chamfer is at an angle to the pin longitudinal axis of from 15 to 85 degrees.

30. The assembly of claim 29, wherein the angle is from 30 to 60 degrees.

31. The work vehicle of claim 20, wherein the predetermined limit corresponds to a vehicle speed of no more than two miles per hour.

* * * * *